United States Patent Office 3,085,863
Patented Apr. 16, 1963

3,085,863
METHOD OF MAKING SILICON CARBIDE
Jerome S. Prener, Schenectady, N.Y., assignor to General
Electric Company, a corporation of New York
No Drawing. Filed Nov. 1, 1960, Ser. No. 66,413
6 Claims. (Cl. 23—208)

The present invention relates to an improved method of making highly pure silicon carbide. It has for its general object the provision of a practical process for producing silicon carbide sufficiently pure for use in semiconductor devices and electroluminescent apparatus. A distinctive aspect of the present process resides in forming an initial gel of precursor compounds which, when heated, evolves gaseous compounds and elements to provide an intimate, highly reactive mixture from which highly pure silicon carbide is formed upon heating.

Semiconductive and electroluminescent materials depend on high purity and a predetermined concentration of specific impurities for their effective operation. In the practical manufacture of such devices, it is necessary to utilize highly purified materials such as elemental silicon or elemental carbon, especially in relation to metallic impurities. Similarly, highly purified silicon carbide in combined form possesses semiconductive characteristics, making it desirable for use in semiconductor and electroluminescent devices, provided that it can be economically manufactured to purity standards comparable with the standards of purity used for other semiconductive materials.

Commercial silicon carbide is manufactured by electric furnace processes, usually using glass sand ($SiO_2$) and high grade coke (e.g. low ash petroleum coke or pitch coke). Even with relatively high grade starting materials, the process inherently tends to produce a relatively impure product, usually including aluminum, magnesium, calcium, graphite, and free silicon as impurities. The product is a hard crystalline material that cannot be readily purified. While the purity of the product can, to some extent, be improved by using unusually pure materials such as spectroscopic grade graphite and semiconductive grade silicon, the powdering and mixing steps required, as well as other steps, tend to introduce impurities and result in a product that falls short of meeting the exacting purity requirements for semiconductor and electroluminescent device uses.

In accordance with the present invention, the problems inherent in forming a mixture of silicon and carbon for reaction to silicon carbide are eliminated through formation of an initial mixture of precursor compounds which, when heated, form a highly reactive homogeneous mixture of silica and carbon and, ultimately, silicon carbide. The preferred precursor materials are an aqueous sucrose solution and silicon tetrachloride. The latter is added to the former in approximately the stoichiometric equivalent quantity required for later production of silicon carbide, forming a silica gel with the sucrose solution. The carbon atoms of the sugar and the silicon atoms of the silica are homogeneously diffused throughout this gel and are in combined molecular form. The silica gel is thereupon dehydrated at approximately 250° C., forming an intimate, finely divided mixture of silica and carbon. This mixture is then heated to about 1800° C. in an inert atmosphere such as argon to drive off the carbon monoxide and form pure cubic silicon carbide in the form of a light yellow powder. This material is sufficiently free from impurities for use as semiconductive or electroluminescent material.

It is, therefore, a general object of the present invention to provide an improved process for the manufacture of silicon carbide of purity sufficient for use as semiconductive or electroluminescent material.

It is another object of the present invention to provide an improved process for the manufacture of pure silicon carbide in which a gel is initially formed of appropriate precursor material which, when heated, ultimately forms silicon carbide.

Still another object of the present invention is to provide an improved process for the manufacture of silicon carbide in which readily available, highly pure precursor materials are combined in such fashion as to provide a highly reactive homogeneous mixture capable of forming silicon carbide under further treatment.

Yet another object of the present invention is to provide an improved process for the manufacture of silicon carbide in which an initial mixture of precursor materials is readily treated to form silicon carbide without the introduction of impurities.

The novel features which I believe to be characteristic of my invention are set forth with particularity in the appended claims. My invention itself, together with further objects and advantages thereof, will best be understood by reference to the following description.

Silicon carbide is made pursuant to the present invention by first forming an aqueous sugar solution. The solution is made with highly purified water into which the sugar is dissolved. The quantity of sugar utilized is chosen as the quantity capable of providing the requisite stoichiometric quantity of carbon when the gel is formed, as hereinafter described.

The preferred sugar is sucrose. It is readily available in highly purified form in relation to metallic elements. The metallic elements, it will be recalled, are particularly troublesome impurities in semiconductor and electroluminescent devices. Even ordinary table sugar, which is commercial grade sucrose, is largely devoid of metallic impurities, making it actually or almost sufficiently pure for purposes of the present process. To the extent the initial sucrose is not sufficiently pure, the troublesome metallic impurities can be removed through recrystallization or the use of ion exchange resins in a manner similar to the purification processes used in purifying raw commercial sugar.

Sucrose is preferred as the sugar because of its ready availability. Other sugars such as dextrose, levulose, their mixture (inert sugar), lactose, and the like may be used, and may be readily made in highly purified form by recrystallization, ion exchange processes, and the like.

Following the preparation of the sugar solution, a silica gel forming compound is added in amount sufficient to form a gel. The preferred compound for this purpose is silicon tetrachloride. This compound is a colorless fuming liquid boiling at 58° C. which is commercially available in highly purified form. To the extent that additional purification of this compound is required, it can be accomplished through distillation. Upon its introduction to the sugar solution, the silicon tetrachloride reacts with the water to form hydrogen chloride and silicon dioxide hydrate (silica gel). The hydrogen chloride formed at this point in the process has the advantage of forming metallic chlorides with any metallic impurities, which chlorides are later volatilized.

As is later described in detail, the silica gel is dehydrated to form a mixture of silica and carbon in essentially the stoichiometric equivalents required to form the silicon carbide, after giving allowance for the carbon driven off as a carbon monoxide. The strength of the sugar solution is accordingly chosen to provide essentially this equivalent relationship when the quantity of silica gel forming compound required to form the gel has been added.

Alternate silica gel forming compounds include any other high purity silicon-halogen compound such as $SiI_4$, $Si_2Cl_6$, $Si_3Cl_8$, $SiBr_4$, $SiF_4$, and $H_2SiF_6$, and the like.

The silica gel formed in the sugar solution is then dehydrated. Preferably this is accomplished by heating to about 250° C., driving off the water and volatile impurities and forming a very intimate, finely divided mixture of silica and carbon. Since the silica and carbon atoms are initially dispersed homogeneously in the silica gel, they remain dispersed throughout the mass formed upon dehydration.

The dehydrated silica gel product is then heated to form silicon carbide. This is done in a vacuum or a non-reactive atmosphere to preclude the formation of oxides or other impurities. Preferably the mixture is heated to about 1800° C. in an atmosphere of argon. Alternative non-reactive atmospheres include other noble gases or any other gas which is non-reactive with silicon carbide at the reaction temperature and which is electrically insignificant in silicon carbide. The mixture is heated for a time sufficient to complete the silicon carbide reaction process, forming a highly pure, light yellow powder which is cubic silicon carbide. This material is highly useful as a semiconductive material and as an electroluminescent material.

In chemical reaction form, the process herein described in its preferred form may be summarized as follows:

(1) $SiCl_4$+sucrose solution→$SiO_2 \cdot xH_2O$ (silica gel containing trapped sucrose) +HCl (2) $SiO_2 \cdot xH_2O$ (gel containing trapped sucrose) $\xrightarrow{200-300°\text{ C.}}$ $SiO_2$+3C (finely divided, intimate mixture)

(3) $SiO_2$+3C $\xrightarrow[\text{argon}]{1800°\text{ C.}}$ SiC+2CO

As the last above equation indicates, the required stoichiometric relationship at the last step of the process is three atoms of carbon to each atom of silicon dioxide (silica). To accomplish this, the concentration of the sugar solution at the time of gel formation should provide approximately three carbon atoms for each silicon atom. A greater or smaller quantity of sugar in solution results in a corresponding amount of uncombined carbon or silicon, as the case may be. If such uncombined carbon or silicon is desired, the quantity of sugar can be chosen accordingly.

The following is a specific example of a process contemplated by the present invention:

1051 grams of pure sucrose are added to 100 ml. of distilled water in an appropriate container and at room temperature and stirred until dissolved. To this solution is then added, with stirring and at room temperature, 20.86 grams of silicon tetrachloride, forming a gel at the conclusion of this addition. The material is now heated slowly to 200–300° C. over a period of 24 hours, decomposing the sugar to form carbon and driving off volatile materials. At this point the product is silica with approximately three equivalent weights of pure carbon in a finely divided, intimate mixture. The product in this form is transferred to a refractory non-reactive dish of high purity graphite and placed in an oven having an argon atmosphere. It is thereupon heated to approximately 1800° C. for four hours, after which time the cubic silicon carbide is found as a light yellow powder.

While I have shown and described the process of the present invention in its preferred form and with respect to certain specific alternatives, it will, of course, be understood that other modifications and alternatives may be employed without departing from the true spirit and scope of the present invention. I therefore intend by the appended claims to cover all such modifications and alternatives as fall within their true spirit and scope.

What I claim as new and desire to secure by Letters Patent of the United States is:

1. The process of making pure silicon carbide, said process including the steps of; adding silicon tetrachloride to a sucrose solution to form a silica gel; dehydrating the gel to decompose the sugar and form a homogeneous, intimate, finely divided mixture of silica and carbon; and heating the mixture in a non-reactive atmosphere to form silicon carbide.

2. The process of making pure silicon carbide, which process includes the steps of; adding silicon tetrachloride to a sugar solution to form a silica gel; dehydrating the gel to decompose the sugar and form a homogeneous, intimate, finely divided mixture of silica and carbon; and heating the mixture in an inert atmosphere to form silicon carbide.

3. The process of making pure silicon carbide, which process includes the steps of; forming a silica gel in sugar solution, dehydrating the gel to decompose the sugar and form a homogeneous, intimate, finely divided mixture of silica and carbon; and heating the mixture in an inert atmosphere to form silicon carbide.

4. In the manufacture of pure silicon carbide the step which comprises; forming a silica gel in a sugar solution; and thereafter heating the same to form a homogeneous, intimate, finely divided mixture of silica and carbon and subsequently silicon carbide.

5. A process for the manufacture of silicon carbide comprising the steps of; forming a sugar solution; adding silicon tetrachloride to the solution until gel formation, the strength of the solution being such as to provide approximately three carbon atoms per silicon atom at the time of gel formation; drying the gel to decompose the sugar and form a homogeneous, intimate, finely divided mixture of silica and carbon; and heating the mixture in a non-reactive atmosphere to form silicon carbide.

6. The process of making pure silicon carbide in which silica gel is formed in sugar solution; the resulting mass is heated at approximately 250° C. until the sugar is decomposed and an intimate, homogeneous, finely divided mixture of silica and carbon is formed; and the mixture is then heated in an inert atmosphere to approximately 1800° C. to form cubic silicon carbide as a light yellow powder.

References Cited in the file of this patent

UNITED STATES PATENTS 2,715,060     Barry _____ Aug. 9, 1955

OTHER REFERENCES

Refractory Hard Metals, by Schwarzkopf and Kiefer, 1953, pages 57 and 59.

Comprehensive Treatise on Inorganic and Theoretical Chemistry (1924), vol. 5, page 876.